United States Patent Office 3,006,916
Patented Oct. 31, 1961

3,006,916
4 - (ω-DIALKYLAMINOALKYL)-2-PHENYL-3-KETO-2,3-DIHYDRO-1,4-BENZOTHIAZINES AND SALTS THEREOF
Stanley O. Winthrop, Montreal, Quebec, and Roger Gaudry, Mount Royal, Quebec, Canada, assignors to American Home Products Corporation, New York, N.Y., a corporation of Delaware
No Drawing. Filed June 4, 1958, Ser. No. 739,670
8 Claims. (Cl. 260—243)

This invention relates to new chemical compounds having valuable therapeutic activity and to the method of preparing these compounds from readily available starting materials.

More particularly, our invention is directed to new compounds which may be chemically characterized as 4 - (ω - dialkylaminoalkyl) - 2-phenyl-3-keto-2,3-dihydro-1,4-benzothiazines and their salts, especially their hydrohalide and methohalide quaternary salts. These substituted benzothiazines may be further substituted by a chlorine atom in the 6-position.

Our invention is also concerned with novel procedures by which these compounds may be prepared.

The novel chemical compounds which form the subject matter of our invention, in base form, may be represented by the structural formula

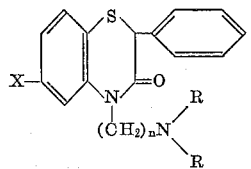

where $n$ is an integrer, either 2 or 3; R represents lower alkyl; and X represents either hydrogen or chlorine.

As previously noted our invention is also concerned with the hydrohalide salts and methohalide quaternary salts of the novel bases whose structural formula is given above.

These new chemical compounds, both in base form, and in the form of their hydrohalide and methohalide quaternary salts, possess activity as anticholinergics and antihistaminics.

In preparing our new chemical compounds not containing chlorine, we prefer to start with ethyl α-bromophenylacetate and o-aminothiophenol. Where benzothiazine derivatives substituted by chlorine in the 6-position are desired, the starting material 2-amino-4-chlorobenzenthiol, or a metal salt thereof such as the zinc salt, will be utilized in place of o-aminothiophenol.

The starting material, ethyl α-bromophenylacetate, may be readily prepared by procedures given in the chemical literature as, for example, that of Schwenk and Papa reported in J.A.C.S., 70, page 3626 (1948).

The chemical reactions by which our novel therapeutically active compounds may be prepared can be represented as follows:

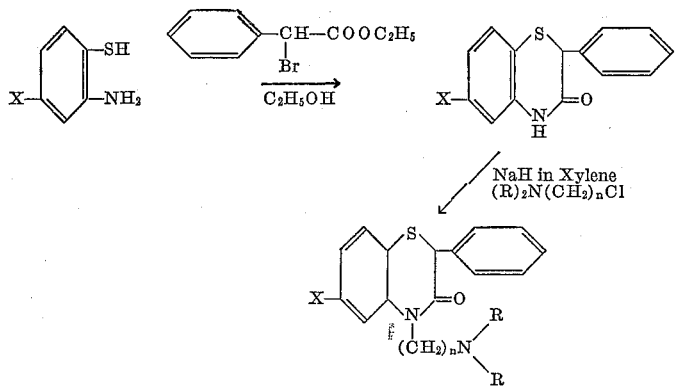

where $n$ represents an integer, either 2 or 3; R represents lower alkyl; and X is selected from the group consisting of hydrogen and chlorine.

The intermediate compound 2-phenyl-3-keto-2,3-dihydro-1,4-benzothiazine, or, where 6-chloro substituted derivatives are desired, the intermediate compound 6-chloro-2-phenyl-3-keto-2,3-dihydro-1,4 - benzothiazine, is first prepared by reacting ethyl α-bromophenylacetate and either o-aminothiophenol, or 2-amino-4-chlorobenzenethiol. When utilizing the latter compound as one of the reagents it is preferable to use it in the form of its metal salt, i.e. as the zinc salt of 2-amino-4-chlorobenzenethiol.

In accordance with the general procedure of N. A. Langlet, Bihang Till K. Svenska Vet. Akad. Hanglingar, 22II, 2 (1896), o-aminothiophenol and ethyl α-bromophenylacetate are heated to reflux in ethanol. When reacting 2-amino-4-chlorobenzenthiol and ethyl α-bromophenylacetate, the zinc salt of 2-amino-4-chlorbenzenethiol is preferably first heated to reflux in a solution of sodium ethylate formed by the addition of metallic sodium to absolute ethanol. The ethyl α-bromophenylacetate is then added and refluxing continued. The product is subsequently recovered upon removal of the ethanol by evaporation in vacuo, i.e. at a reduced pressure.

The 2 - phenyl - 3 - keto-2,3-dihydro-1,4-benzothiazine, which may, or may not, also contain a chloro substituent in the 6-position, is then reacted with a di-loweralkylaminoalkyl halide, more particularly a compound of the formula

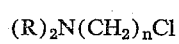

wherein $n$ is an integer, either 2 or 3, and R is lower alkyl. This reaction is preferably carried out by bringing the two compounds together in an inert solvent in the presence of a condensing agent such as sodium hydride. The reaction mixture is heated to reflux, and upon completion of the reaction the product is recovered from the reaction mixture.

In forming the hydrohalide acid addition salts a hydrogen halide, such as hydrogen chloride, may be added directly to an ether solution of the free base. The methohalide quaternary salts are formed in the conventional manner by the addition of a methyl halide, such as methyl chloride, to a solution of the base.

The following examples are illustrative of our invention.

EXAMPLE 1

*6-chloro-2-phenyl-3-keto-2,3-dihydro-1,4-benzothiazine*

3.8 grams (0.01 mole) of the zinc salt of 2-amino 4-chlorobenzenethiol and 4.9 grams (0.02 mole) of ethyl α-bromophenylacetate were added to 50 milliliters of absolute ethanol containing 0.05 gram (0.022 mole) of sodium. The zinc salt was first refluxed for two hours in the sodium ethylate solution before adding the ethyl α-bromophenylacetate, whereupon this latter reagent was added and refluxing continued for another four hours.

The ethanol was removed by evaporation in vacuo, i.e. at a pressure below atmospheric, and the residue was then triturated with aqueous isopropanol. There resulted 5 grams of a solid product melting at 210–218° C. This solid product was dissolved in acetone and 0.7 gram of undissolved inorganic material removed. On evaporation of the acetone there was left 3.5 grams of 6 - chloro - 2 - phenyl - 3 - keto - 2,3 - dihydro - 1,4-benzothiazine, melting at 216–218° C.

Analysis confirmed the empiric formula $C_{14}H_{10}OSClN$.
Required: N, 5.08; Cl, 12.86; S, 11.62. Found: N, 5.03, 5.01; Cl, 13.08, 12.56; S, 11.19.

EXAMPLE 2

*4-(3'-dimethylaminopropyl)-2-phenyl-3-keto-2,3-dihydro-1,4-benzothiazine*

29.1 grams (0.1 mole) of 2-phenyl-3-keto-2,3-dihydro-1,4-benzothiazine and 2.6 grams (0.11 mole) of sodium hydride were added to 150 milliliters of xylene and the mixture heated to reflux for two hours. 13.4 grams (0.11 mole) of dimethylaminopropylchloride was then added dropwise and refluxing continued for 16 hours. The precipitated sodium chloride was removed and the xylene evaporated down in vacuo, i.e. at a pressure less than atmospheric, leaving an oily residue. This oil residue was dissolved in dilute hydrochloric acid and insoluble material removed and discarded. The filtrate was then neutralized with sodium carbonate and extracted with ether. After being dried, the ether was removed by evaporation and there was secured 17.3 grams of solid product, 4-(3'-dimethylaminopropyl)-2-phenyl-3-keto-2,3-dihydro-1,4-benzothiazine.

After two recrystallizations from hexane, the purified compound melted at 74–75° C. A sample was further purified by distillation at 0.1 millimeter of mercury pressure, boiling point 184–186° C.

Analysis confirmed the empiric formula $C_{19}H_{22}OSN_2$.
Required: C, 69.91; H, 6.79. Found: C, 70.17; H, 6.77.

The hydrochloride salt was prepared by the addition of an excess amount of an ethereal solution of hydrogen chloride to an ether solution of the free base. Upon recrystallization from isopropanol, the hydrochloride salt of 4 - (3' - dimethylaminopropyl) - 2 - phenyl - 3 - keto-2,3-dihydro-1,4-benzothiazine melted at 210–212° C.

Analysis confirmed the empiric formula $C_{19}H_{23}OSN_2Cl$.
Required: N, 7.72; Cl, 9.77. Found: N, 7.55, 7.57; Cl, 10.10, 9.65.

The methobromide salt was prepared by the addition of methyl bromide to an ether solution of the free base. Two recrystallizations from ethanol gave the substantially pure methobromide quaternary salt of 4-(3'-dimethylaminopropyl) - 2 - phenyl - 3 - keto - 2,3 - dihydro - 1,4-benzothiazine, melting at 218–220° C.

Analysis confirmed the empiric formula $C_{20}H_{25}N_2SOBr$.
Required: N, 6.65; Br, 18.96. Found: N, 7.00, 6.83; Br, 19.63.

EXAMPLE 3

*4-(2'-diethylaminoethyl)-2-phenyl-3-keto-2,3 dihydro-1,4-benzothiazine*

By following the procedure described in Example 2, 24.1 grams (0.1 mole) of 2-phenyl-3-keto-2,3-dihydro-1,4-benzothiazine, 14.9 grams (0.11 mole) of diethylaminoethylchloride, and 2.6 grams (0.11 mole) of sodium hydride were heated to reflux in 150 milliliters of xylene. The recovered product was 4-(2'-diethylaminoethyl) - 2 - phenyl - 3 - keto - 2,3 - dihydro - 1,4 - benzothiazine. The weight of the product secured was 21.9 grams, after purification by distillation at 188–192° C. and 0.08 millimeter mercury pressure.

Analysis confirmed the empiric formula $C_{20}H_{24}N_2SO$.
Required: C, 70.55; H, 7.10; N, 8.24. Found: C, 71.09; H, 7.29; N, 8.25, 8.15.

The hydrochloride salt was prepared by the addition of ethereal hydrogen chloride solution to an ether solution of the free base. After three recrystallizations from isopropanol, the substantially pure salt, melting at 158–159° C., was secured.

Analysis confirmed the empiric formula $C_{20}H_{25}N_2SOCl$.
Required: N, 7.43; Cl, 9.41. Found: N, 7.75, 7.54; Cl, 9.47, 9.07.

EXAMPLE 4

*4-(3'-dimethylaminopropyl)-6-chloro-2-phenyl-3-keto-2,3-dihydro-1,4-benzothiazine*

By following the procedure described in Example 2, 18.0 grams (0.065 mole) of 6-chloro-2-phenyl-3-keto-2,3-dihydro-1,4-benzothiazine, 8.8 grams (0.072 mole) of dimethylaminopropylchloride and 1.8 grams (0.072 mole) of sodium hydride were reacted in 125 milliliters of xylene. This resulted in the product 4-(3'-dimethylaminopropyl) - 6 - chloro - 2 - phenyl - 3 - keto - 2,3-dihydro-1,4-benzothiazine, and it was secured in the amount of 11.0 grams. Upon recrystallization from hexane the melting point of the purified product was found to be 74–76° C.

Analysis confirmed the empiric formula $C_{19}H_{21}OSN_2Cl$.
Required: C, 63.24; H, 5.87; S, 8.88; N, 7.76; Cl, 9.82. Found: C, 63.94; H, 6.04; S, 8.69; N, 7.96; Cl, 9.75.

The hydrochloride salt was prepared by the addition of an excess amount of ethereal hydrogen chloride to a solution of the free base in ether. Upon recrystallizing twice from isopropanol-ether, the melting point of the purified product was found to be 186–188° C.

Analysis confirmed the empiric formula $$C_{19}H_{22}OSN_2Cl_2$$

Required: N, 7.05; S, 8.06; Cl, 17.85. Found: N, 6.94; S, 7.67; Cl, 17.75.

We claim:
1. A compound selected from the group which consists of the bases of the formula

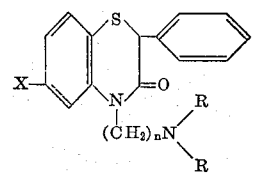

where R represents lower alkyl, $n$ is an integer selected from the group consisting of 2 and 3, and X is selected from the group consisting of hydrogen and chlorine; and the hydrohalide and methohalide quaternary salts of said bases.

2. 4 - (3' - dimethylaminopropyl) - 2 - phenyl - 3-keto-2,3-dihydro-1,4-benzothiazine.

3. 4 - (2' - diethylaminoethyl) - 2 - phenyl - 3 - keto-2,3-dihydro-1,4-benzothiazine.

4. 4 - (3' - dimethylaminopropyl) - 6 - chloro - 2-phenyl-3-keto-2,3-dihydro-1,4-benzothiazine.

5. 4 - (3' - dimethylaminopropyl) - 2 - phenyl - 3-keto-2,3-dihydro-1,4-benzothiazine hydrochloride.

6. 4 - (3' - dimethylaminopropyl) - 2 - phenyl - 3-keto-2,3-dihydro-1,4-benzothiazine methobromide.

7. 4 - (2' - diethylaminoethyl) - 2 - phenyl - 3 - keto-2,3-dihydro-1,4-benzothiazine hydrochloride.

8. 4 - (3' - dimethylaminopropyl) - 6 - chloro - 2-phenyl - 3 - keto - 2,3 - dihydro - 1,4 - benzothiazine hydrochloride.

References Cited in the file of this patent

UNITED STATES PATENTS 2,824,102   Zimmerman _____ Feb. 18, 1958

OTHER REFERENCES

Unger et al: Berichte, vol. 30, pp. 2389–2399 (1897).

Fujii: J. Pharm. Soc., Japan, vol. 77, April 1957, pp. 347–51 and 355–58.

Fujii et al.: J. Pharm. Soc., Japan, vol. 77, April 1957, pp. 362–66.